(12) United States Patent
Kei

(10) Patent No.: US 8,456,587 B2
(45) Date of Patent: Jun. 4, 2013

(54) ELECTRONIC APPARATUS

(75) Inventor: Hidetoshi Kei, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 12/754,277

(22) Filed: Apr. 5, 2010

(65) Prior Publication Data

US 2010/0259705 A1 Oct. 14, 2010

(30) Foreign Application Priority Data

Apr. 8, 2009 (JP) .................................. 2009-093740

(51) Int. Cl.
*G02F 1/1333* (2006.01)
(52) U.S. Cl.
USPC ............................................................ 349/58
(58) Field of Classification Search
USPC ........................................................ 349/58–59
See application file for complete search history.

(56) References Cited

U.S. PATENT DOCUMENTS

| | | | | |
|---|---|---|---|---|
| 7,038,741 B2* | 5/2006 | Lai et al. | ........................ | 349/58 |
| 7,405,777 B2* | 7/2008 | Shimizu | ........................ | 349/58 |
| 7,933,123 B2* | 4/2011 | Wang et al. | .............. | 361/679.56 |
| 2006/0072050 A1* | 4/2006 | Lee | ................................ | 349/58 |
| 2007/0002207 A1* | 1/2007 | Kim et al. | ........................ | 349/58 |
| 2007/0252922 A1* | 11/2007 | Oohira | ............................ | 349/58 |
| 2009/0009679 A1* | 1/2009 | Ke et al. | ............................ | 349/58 |
| 2010/0029349 A1* | 2/2010 | Ogatsu | ........................ | 455/575.4 |

FOREIGN PATENT DOCUMENTS

| | | |
|---|---|---|
| CN | 1637499 A | 7/2005 |
| CN | 101106646 A | 1/2008 |
| JP | 2005-189512 | 7/2005 |
| JP | 2006-135842 A | 5/2006 |

OTHER PUBLICATIONS

Chinese Office Action with an English Translation, that issued in Chinese Patent Application No. 201010143010.2.

* cited by examiner

*Primary Examiner* — Eric Wong
(74) *Attorney, Agent, or Firm* — Cowan, Liebowitz & Latman, P.C.

(57) ABSTRACT

An electronic apparatus includes a display unit, a frame member that encloses a periphery of the display unit, a window member that covers a display surface of the display unit, and a cover member including a window holder configured to hold an outer circumference of the window member. The frame member includes a window support configured to support the window member at a position apart from the display surface of the display unit. The window holder of the cover member exposes the window support of the frame member. The window support of the frame member directly supports the window member without intervening the window holder of the cover member.

4 Claims, 6 Drawing Sheets

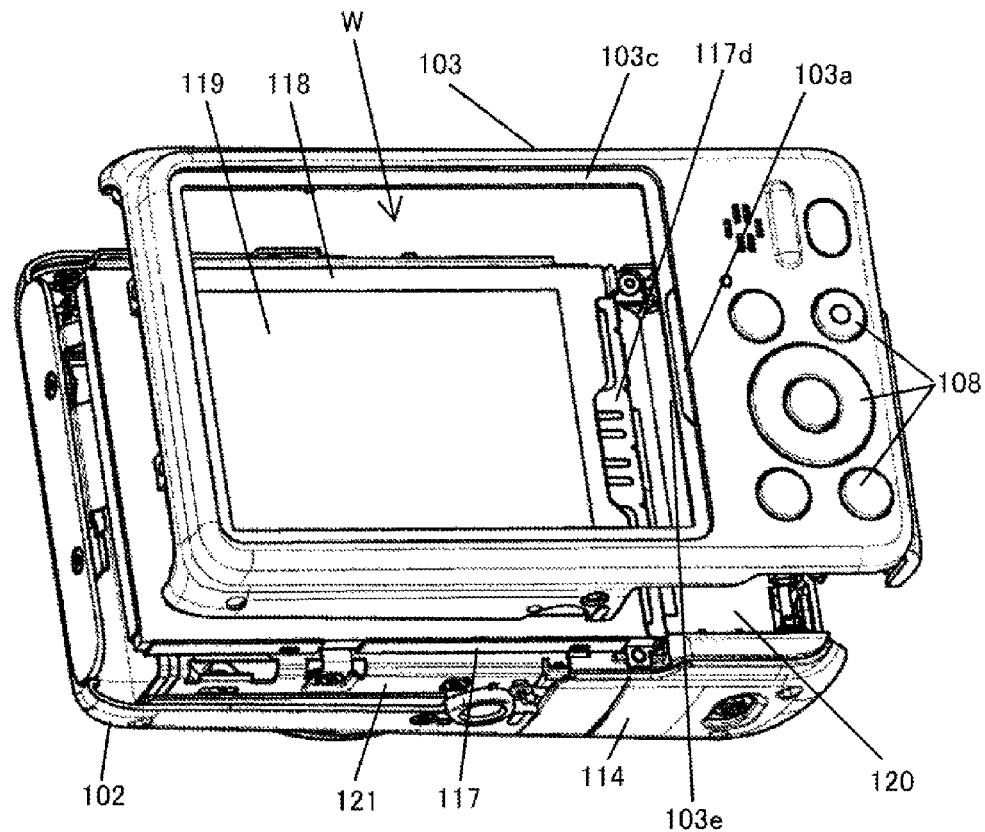
FIG. 1
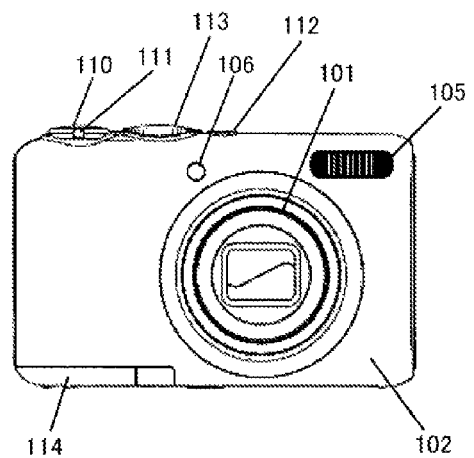
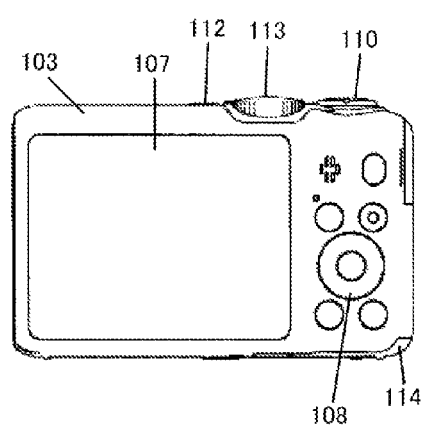
FIG. 2A    FIG. 2B

ELECTRONIC APPARATUS

BACKGROUND OF THE INVENTION

1. Field of the Invention

The present invention relates to an electronic apparatus having a display unit, and more particularly to a protective structure for the display unit.

2. Description of the Related Art

An electronic apparatus, such as a digital camera, includes a display unit configured to display an image and a letter, such as an LCD panel. A display surface of the display unit is often covered with a transparent window member held by an cover member of an electronic apparatus.

It is necessary for such an electronic apparatus to prevent damages of the display unit caused by an external force applied to a window member and a cover member. Japanese Patent Laid-Open No. ("JP") 2005-189512 discloses a structure that arranges a cushion material between the display unit and the cover member holding the window member, and prevents the cover member deformed by the external force from contacting the display unit.

However, the structure disclosed in JP 2005-189512 can prevent the cover member deformed by the external force from contacting the display unit, but the external transmits to the display unit via the cover member and the cushion material. Therefore, this structure cannot provide a sufficient damage preventive effect for the display unit.

SUMMARY OF THE INVENTION

The present invention provides an electronic apparatus including a structure that can effectively prevent the external force from damaging a display unit.

An electronic apparatus according to one aspect of the present invention includes a display unit, a frame member that encloses a periphery of the display unit, a window member that covers a display surface of the display unit, and a cover member including a window holder configured to hold an outer circumference of the window member. The frame member includes a window support configured to support the window member at a position apart from the display surface of the display unit. The window holder of the cover member exposes the window support of the frame member. The window support of the frame member directly supports the window member without intervening the window holder of the cover member.

Further features of the present invention will become apparent from the following description of exemplary embodiments with reference to the attached drawings.

BRIEF DESCRIPTION OF THE DRAWINGS

FIG. 1 is an exploded perspective view of a digital camera according to this embodiment of the present invention.

FIGS. 2A and 2B are front and rear views of the digital camera according to this embodiment.

DESCRIPTION OF THE EMBODIMENTS

Figure 3:
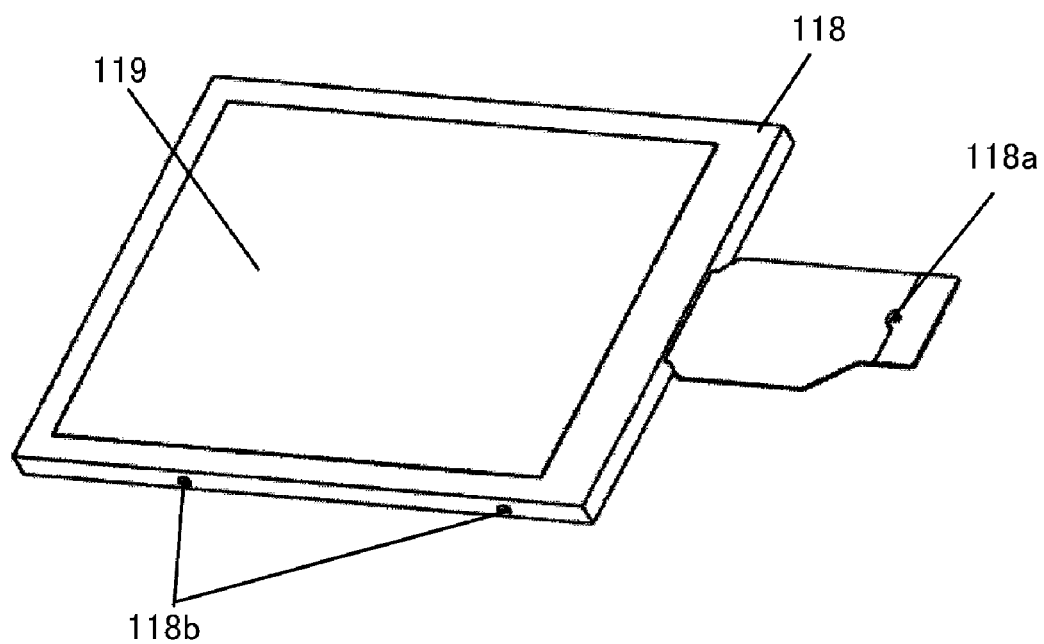
FIG. 3 is a perspective view of a liquid crystal unit of the digital camera according to this embodiment.

Referring now to the drawings, a description will be given of an embodiment of the present invention.

FIG. 1 is an exploded view of a digital camera (image pickup apparatus simply referred to as a "camera" hereinafter) as an electronic apparatus according to this embodiment of the present invention. FIGS. 2A and 2B show the appearance of the digital camera.

In FIG. 1, reference numeral 103 denotes a rear cover, which serves as a cover member that covers a rear side of a camera body that includes a main chassis (chassis member) 121, a variety of components (not shown) held by the main chassis 121, such as an electric circuit substrate and an image pickup device, and a battery box. The main chassis 121 includes a metal plate member having electrical conductivity. Reference numeral 102 also shown in FIG. 2A is a front cover that serves as a cover member that covers a front side of the camera body.

Reference numeral 117 denotes an LCD frame that serves as a frame member made of a metal plate member having electrical conductivity and attached to the main chassis 121 via screws. Reference numeral 118 denotes a liquid crystal unit (display unit) configured to display information, such as an image and a letter, and its periphery is held by the LCD frame 117. Reference numeral 120 denotes a battery box that houses a battery used to supply the power to the camera body.

In FIG. 2A, reference numeral 101 denotes a lens barrel configured to hold an image pickup lens. Reference numeral 105 denotes a flash, and reference numeral 106 denotes an AF auxiliary light window. In FIG. 2B, reference numeral 107 denotes a window member held by the rear cover 103, configured to cover the display surface of the liquid crystal unit 118, and made of a transparent acrylic or polycarbonate plate.

In FIGS. 2A and 2B, reference numeral 110 denotes a release button, and reference numeral 111 denotes a zoom lever. Reference numeral 112 is a power button used for an ON/OFF operation of the power of the camera, and reference numeral 113 denotes a mode dial used to select a photography mode.

In FIGS. 1 and 2B, reference numeral 108 denotes an operating section including operating buttons, and operated for a variety of settings, such as the photography mode. In FIGS. 1, 2A, and 2B, reference numeral 114 denotes a battery lid configured to slide and rotate relative to the camera body, and used to open and close a battery insertion opening for the battery box 120.

FIG. 3 shows the liquid crystal unit 118, which includes a rectangular display surface (display region) 119 in its periphery portion, configured to display information, such as an image and a letter. Reference numeral 118a denotes a flexible printed circuit board ("FPC") extending from the liquid crystal unit 118 and connected to the electric circuit substrate in the camera body. Totally four engagement tabs 118b are formed on end surfaces of two long side portions of the periphery of the liquid crystal unit 118.

Figure 4:
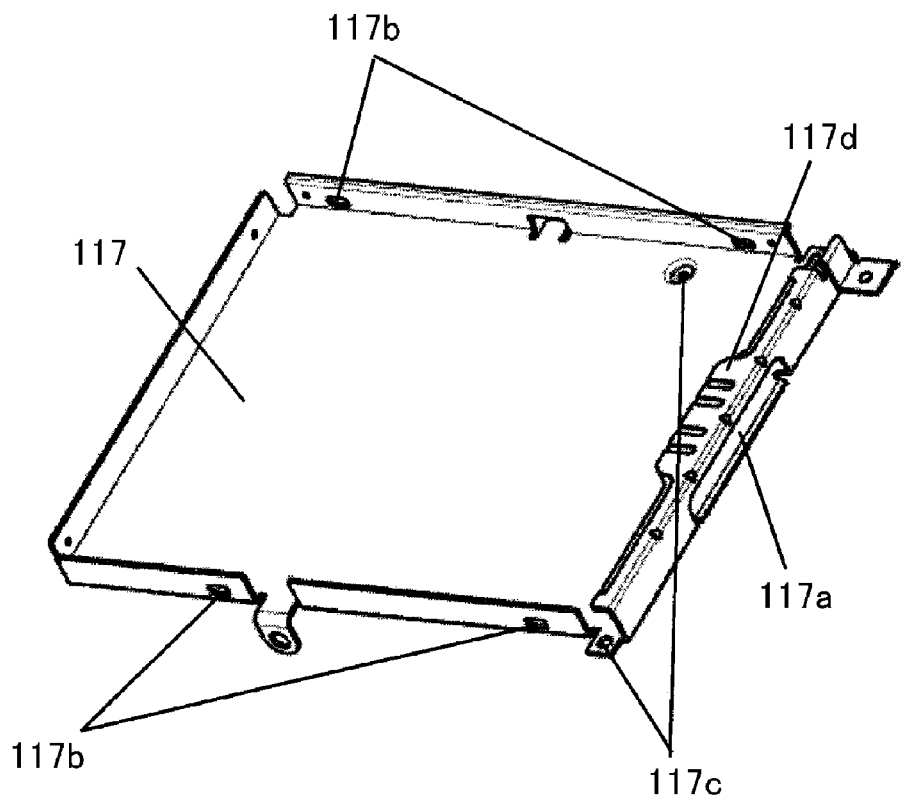
FIG. 4 is a perspective view of an LCD frame used for the digital camera according to this embodiment.

FIG. 4 shows the LCD frame 117, which includes a rectangular bottom surface, and four walls vertically bent from four sides of the bottom surface. An opening 117a having a larger width than the width of the FPC 118a is formed in one of the four walls corresponding to the side from which the FPC 118a of the liquid crystal unit 118 extends. A window support 117d is formed on the top of the wall having the opening 117a, and bent relative to this wall by a right angle so that it can extend parallel to the bottom surface. A role of this window support 117d will be described later.

As described later, the wall support 117d is arranged distant from the liquid crystal unit 118 shown in FIG. 3 when the liquid crystal unit 118 is held by the LCD frame 117. The wall support 117d is formed so that it does not overlap the display surface 119 although it overlaps the periphery of the liquid crystal unit 118 when the wall support 117d is viewed from a direction perpendicular to the display surface 119 of the liquid crystal unit 118 held by the LCD frame 117.

Engagement holes 117b engageable with the four engagement tabs 118b of the liquid crystal unit 118 are formed on two walls on the two long sides of the LCD frame 117. Two positioning holes 117c are formed in the bottom surface.

Figure 5:
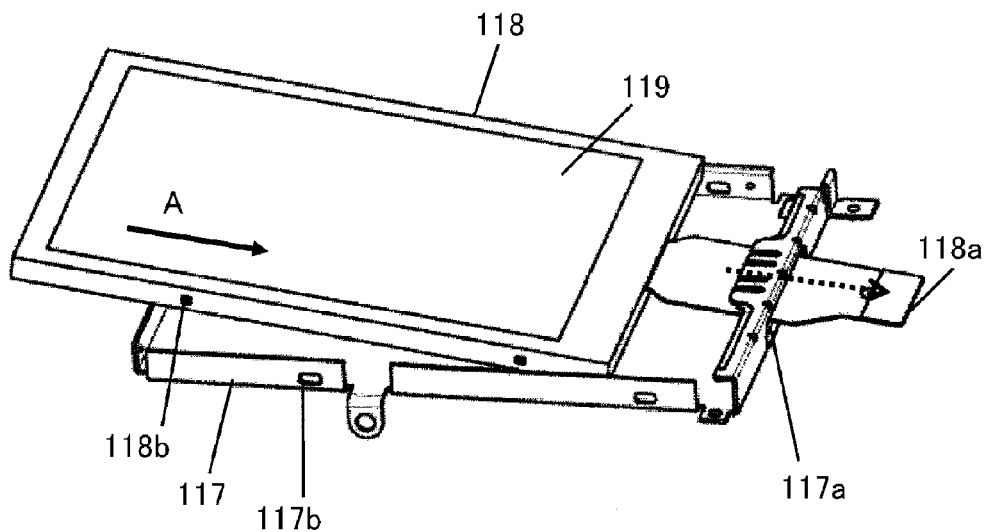
FIG. 5 is a perspective view showing a method of attaching the liquid crystal unit to the LCD frame.
Figure 6:
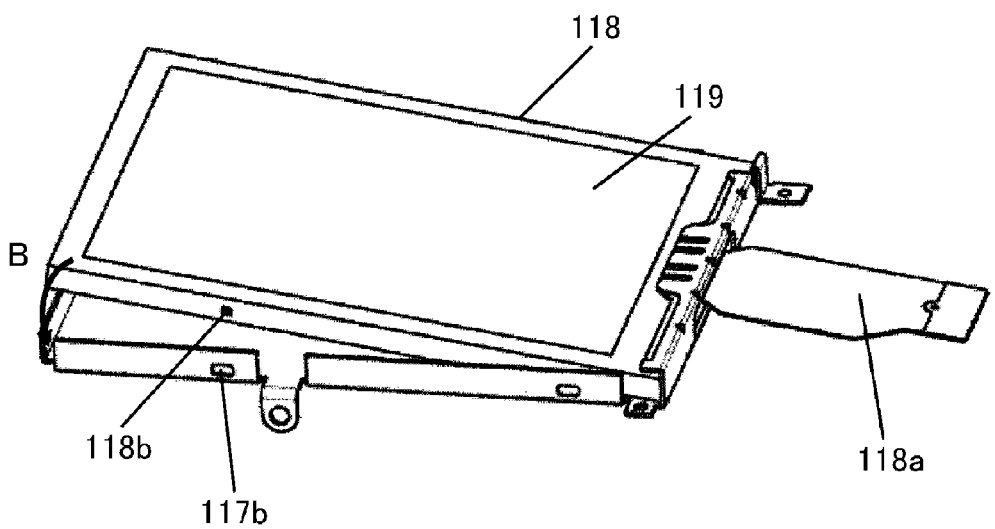
FIG. 6 is a perspective view subsequent to FIG. 5 showing the method of attaching the liquid crystal unit to the LCD frame.
Figure 7:
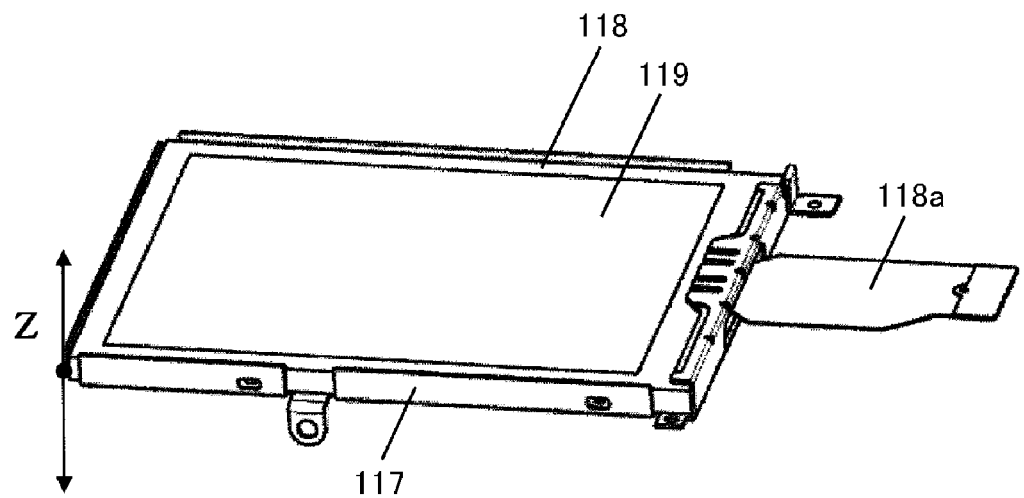
FIG. 7 is a perspective view of the liquid crystal unit held by the LCD frame.

Referring now to FIGS. 5-7, a description will be given of a method of attaching the liquid crystal unit 118 to the LCD frame 117.

Initially, as shown in FIG. 5, the LCD unit 118 is moved in an arrow A direction by inserting the FPC 118a extending from the liquid crystal unit 118 into the opening 117a in the LCD frame 117.

Next, as shown in FIG. 6, the liquid crystal unit 118 is rotated in an arrow B direction when an end surface of the liquid crystal unit 118 on the extending side of the FPC 118a contacts the wall having the opening 117a of the LCD frame 117. At this time, the four engagement tabs 118b of the liquid crystal unit 118 temporarily deform a pair of walls of the two long sides of the LCD frame 117. Thereafter, when each engagement tab 118b is engaged with each engagement hole 117b in the wall on the long side, the walls on the long sides restore to the original shape.

As shown in FIG. 7, while the engagement tabs 118b are engaged with the engagement holes 117b, the liquid crystal unit 118 is prevented from moving relative to the LCD frame 117 in the arrow Z direction (thickness direction) and thus positioned. In addition, in this state, the liquid crystal unit 118 is positioned by four walls of the four sides of the LCD frame 117 on the plane along the display surface 119.

Figure 8:
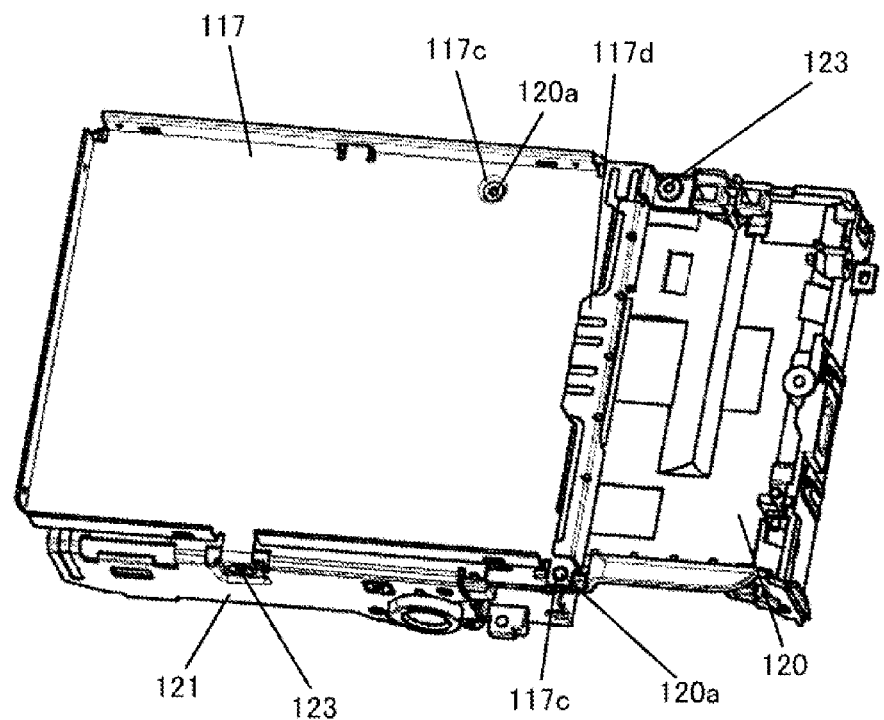
FIG. 8 is a perspective view showing an internal structure of the distal camera according to this embodiment (before the liquid crystal unit is attached).
Figure 9:
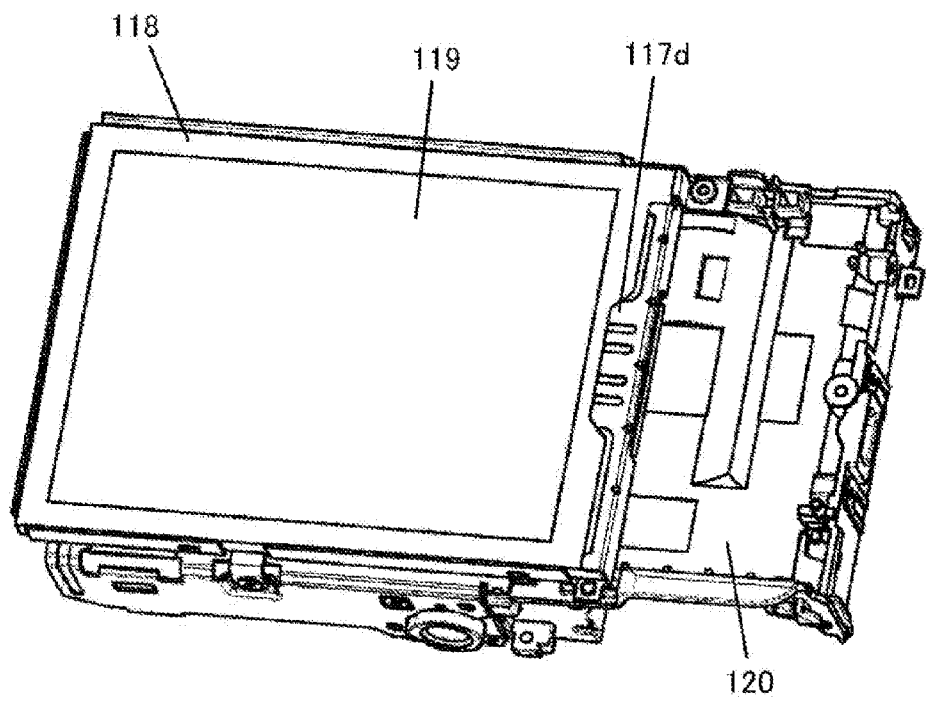
FIG. 9 is a perspective view showing an internal structure of the distal camera according to this embodiment (after the liquid crystal unit is attached).

Next, the LCD frame 117 holding the liquid crystal unit 118 is attached to the main chassis 121. A description will be given of this attachment with reference to FIGS. 8 and 9. FIG. 8 omits the liquid crystal unit 118 for explanation purposes.

Initially, the LCD frame 117 holding the liquid crystal unit 118 is arranged relative to the main chassis 121 so that two positioning bosses 120 of the battery box 120 can be inserted into the two positioning holes 117c of the LCD frame 117. When the positioning bosses 120a are inserted into the positioning holes 117c, the LCD frame 117 holding the liquid crystal unit 118 is positioned relative to the main chassis 121 on the plane along the display surface 119.

Next, two screwing portions of the LCD frame 117 are fixed by screws 123 relative to the main chassis 121 and the battery box 120. Thereby, the LCD frame 117 holding the liquid crystal unit 118 is attached to the camera body with good positional precision.

Figure 10:
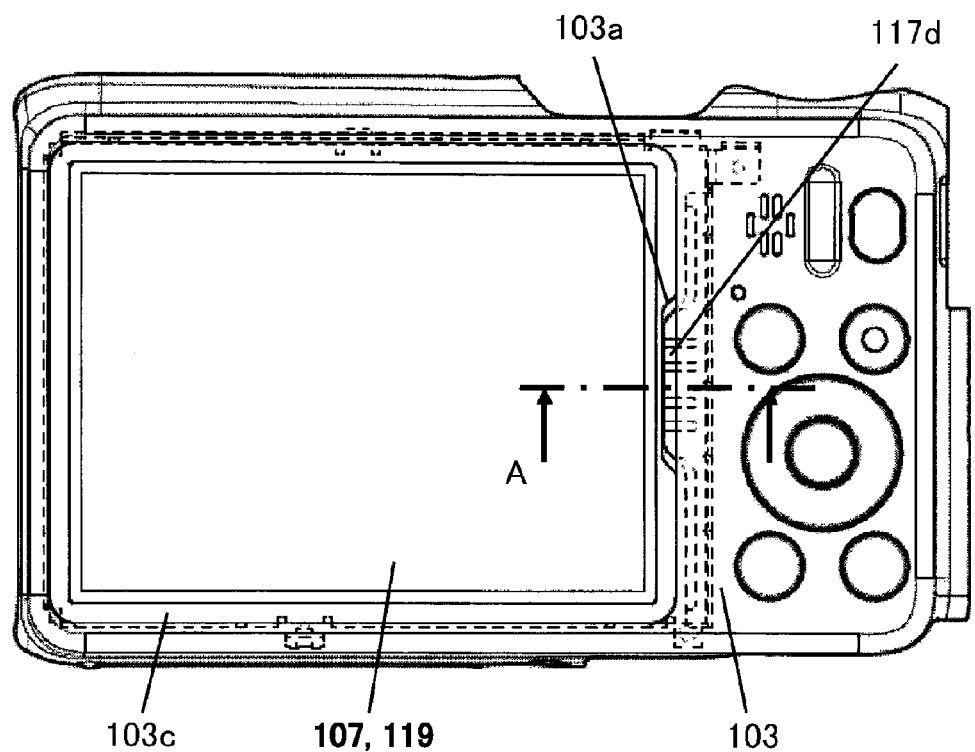
FIG. 10 is a rear view of the digital camera according to this embodiment.
Figure 11:
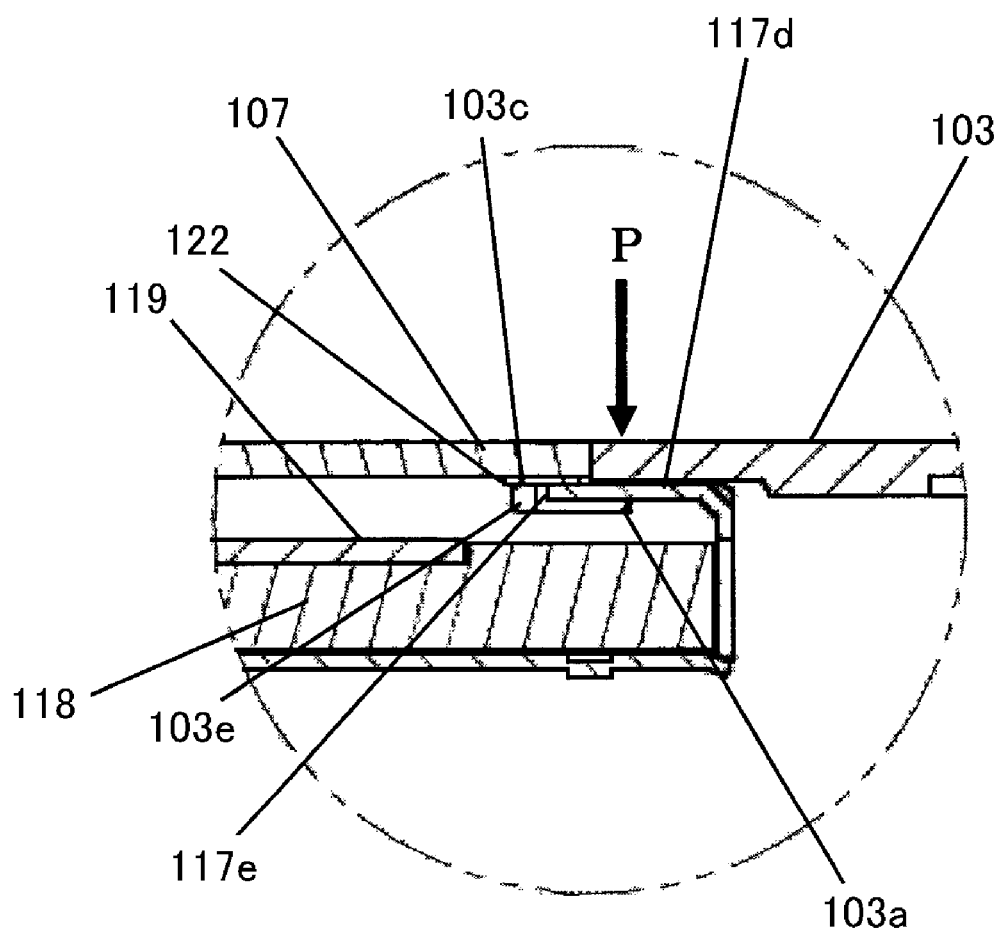
FIG. 11 is a sectional view taken along an A-A line in FIG. 10.

Referring now to FIGS. 1, 10, and 11, a description will be given of a relationship among the rear cover 103, the window member 107, the liquid crystal unit 118, and the LCD frame 117.

As shown in FIG. 1, the rear cover 103 has a rectangular display window W that enables the display surface of the liquid crystal unit 118 to be observed. A rectangular frame shaped window holder 103c is formed around the display window W in the rear cover 103, and retreats from the outer surface of the rear cover 103 by one step.

An opening 103a that perforates the window holder 103c in the thickness direction is formed at a portion of the window holder 103c corresponding to the window support 117d of the LCD frame 117. As shown in FIG. 10, the window holder 103c holds the outer circumference of the window member 107.

FIG. 11 shows a section taken along an A-A line in FIG. 10. An outer circumference portion of the window member 107 is adhered to the outer surface of the window holder 103c by a double-sided tape 122.

The window support 117d of the LCD frame 117 is arranged in the opening 103a in the window holder 103c. Therefore, the window support 117d exposes from the opening 103a and supports the outer circumference portion of the window member 107 via the double-sided tape 122. As described above, the window support 117d is arranged at a portion apart from the surface of the liquid crystal unit 118 on the display surface side.

As best shown in FIG. 1, the window support 117d has a plurality of grooves, and the strength of the window support 117d is more improved than a window support having a simply flat plate shape.

The window support 117d also supports a portion adjacent to the window holder 103c in the rear cover 103.

In this embodiment, the double-sided tape 122 exists between the window support 117d and the outer circumference portion of the window member 107, and the window support 117d does not directly contact the outer circumference portion of the window member 107. However, the double-sided tape 122 is a very thin member, and the window support 117d may be considered to directly contact the outer circumference of the window member 107. Alternatively, the window support 117d is considered to contact the outer circumference of the window member 107 via the double-sided tape 122. In either case, the window support 117d supports the outer circumference portion of the window member 107.

The window holder 103c has a wall portion 103e configured to cover an end surface 117e of the window support 117d on the display surface side in the opening 103a on the plane along the display surface 119. The wall portion 103e hides the end surface 117e on the display surface side of the wind support 117d from the outside through the window member 107.

In such a structure, when an external force is locally applied to the window member 107 or the rear cover 103 in an arrow P direction at an arrow P position and if there is no window support 117d, the window member 107 and the resin rear cover 103 deform in the arrow P direction. As the external force increases, the lower surface of the window holder 103c contacts the liquid crystal unit 118, and may damage the liquid crystal unit 118.

On the other hand, according to this embodiment, the window support 117d of the LCD frame 117 is made of a strong metal plate member and arranged in the opening 103a in the window holder 103c. The window support 117d supports the outer circumference of the window member 107 at a position apart from the liquid crystal unit 118. Thus, the external force applied as described above does not transmit to the liquid crystal unit 118 although it transmits to the LCD frame 117 via the window support 117d.

The window support 117d in the opening 103a of the window holder 103c can be more distant from the liquid crystal unit 118 than the window support 117d contacting the inner surface of the window holder 103c and supports the window holder 103c. Therefore, the window support 117d even if slightly deformed by the external force is unlikely to contact the liquid crystal unit 118.

In addition, the window support 117d supports the portion of the rear cover 103 adjacent to the window holder 103c. Therefore, deformations of the window member 107 and the rear cover 103 caused by the external force can be maintained small.

Thus, this embodiment can provide a camera that can highly effectively prevent damages of the liquid crystal unit 118.

Since the LCD frame that is originally provided in the camera has the window support, it is unnecessary to add another new component separate from the LCD frame.

A shape and position of the window support 117d are not limited to those illustrated, and the window support 117d may have a shape that is advantageous to the strength and a position that supports a weak portion.

As shown in FIG. 11, the window support 117d crosses a border between the rear cover 103 and the window member 107. Hence, the conductive window support 117d (or the LCD frame 117 electrically grounded relative to the main chassis 121) serves as a lightning conductor for the static electricity that may enter through the aperture of the boarder. Therefore, a normal operation of the liquid crystal unit 118 is maintained under the static electricity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, while this embodiment discusses a digital camera having a liquid crystal unit as a display, the present invention is applicable to a variety of electronic apparatuses each having a display unit other than the digital camera. In addition, the display unit may use a selfluminous display panel in addition to the liquid crystal unit.

The present invention can provide an electronic apparatus having a damage preventive effect of the display unit relative to the external force.

This application claims the benefit of Japanese Patent Application No. 2009-093740, filed Apr. 8, 2009, which is hereby incorporated by reference herein in its entirety.

What is claimed is:

1. An electronic apparatus comprising:
   a display unit;
   a frame member that encloses a periphery of the display unit;
   a window member that covers a display surface of the display unit; and
   a cover member including a window holder portion that holds an outer circumference of the window member,
      wherein the frame member includes a window support portion that supports the window member at a position apart from the display surface of the display unit,
      wherein an opening is formed at the window holder portion of the cover member, and
      wherein the window support portion of the frame member is exposed in the opening at the window portion of the cover member, and
      wherein the window support portion of the frame member which is exposed in the opening directly supports the window member;
      wherein the window holder portion of the cover member does not intervene between the window member and the window support portion of the frame member which is exposed in the opening.

2. The electronic apparatus according to claim 1, wherein the window holder portion of the cover member includes a wall portion configured to cover an end surface of the window support portion of the frame member which is exposed in the opening.

3. The electronic apparatus according to claim 1, wherein the window support portion of the frame member supports a portion of the cover member adjacent to the window holder portion.

4. The electronic apparatus according to claim 1,
   wherein the frame member has electric conductivity,
   wherein the frame member is electrically connected to a chassis member of the electronic apparatus, and
   wherein the window support portion of the frame member crosses a border between the window member and the cover member.

* * * * *